United States Patent [19]

Marchand

[11] 4,336,571

[45] Jun. 22, 1982

[54] CORRECTIVE DEVICE FOR THE ORIENTATION OF A HEADLIGHT OF A MOTOR VEHICLE

[75] Inventor: Charles H. Marchand, Drancy, France

[73] Assignee: Cibie Projecteurs, France

[21] Appl. No.: 158,500

[22] Filed: Jun. 11, 1980

[30] Foreign Application Priority Data

Jun. 20, 1979 [FR] France ................................ 79 15800

[51] Int. Cl.³ .............................................. B60Q 1/12
[52] U.S. Cl. ..................................... 362/60; 362/39; 362/384; 362/55; 362/390; 362/59; 362/426; 362/68; 362/271; 362/287; 362/372
[58] Field of Search ....................... 362/39, 40, 55, 57, 362/58, 59, 60, 68, 70, 271, 287, 369, 370, 371, 372, 384, 390, 425, 426

[56] References Cited

U.S. PATENT DOCUMENTS

| | | | |
|---|---|---|---|
| 1,121,824 | 12/1914 | Gray | 362/55 X |
| 1,141,809 | 6/1915 | McKim | 362/55 |
| 1,360,841 | 11/1920 | Whiting | 362/384 X |
| 1,588,809 | 6/1926 | Roth | 362/57 |
| 1,593,075 | 7/1926 | Hensley | 362/384 X |
| 2,445,835 | 7/1948 | Le Clair | 362/384 |
| 2,455,497 | 12/1948 | Kennelly | 362/59 X |
| 2,606,999 | 8/1952 | Tostevin | 362/384 |
| 3,846,627 | 11/1974 | Chastain | 362/384 X |
| 4,066,886 | 1/1978 | Martin | 362/55 X |

FOREIGN PATENT DOCUMENTS 2514053 10/1976 Fed. Rep. of Germany ........ 362/55

*Primary Examiner*—Peter A. Nelson

[57] ABSTRACT

During acceleration and deceleration the front end of the body of a motor vehicle dips or rears on the suspension causing light beams from the headlamps to be directed upwards or downwards too much. To avoid this the orientation of a headlamp is variable by pivoting the lamp relative to the vehicle body, about a horizontal axis extending transversely of the body, in response to operation of an orientation control which responds to acceleration and deceleration.

9 Claims, 3 Drawing Figures

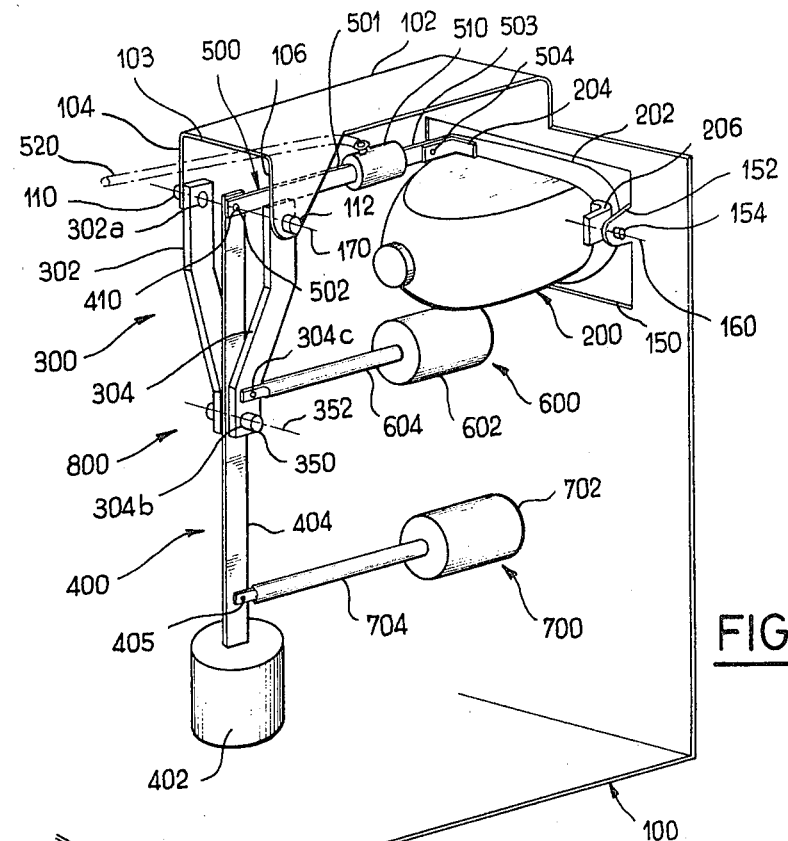
FIG_1
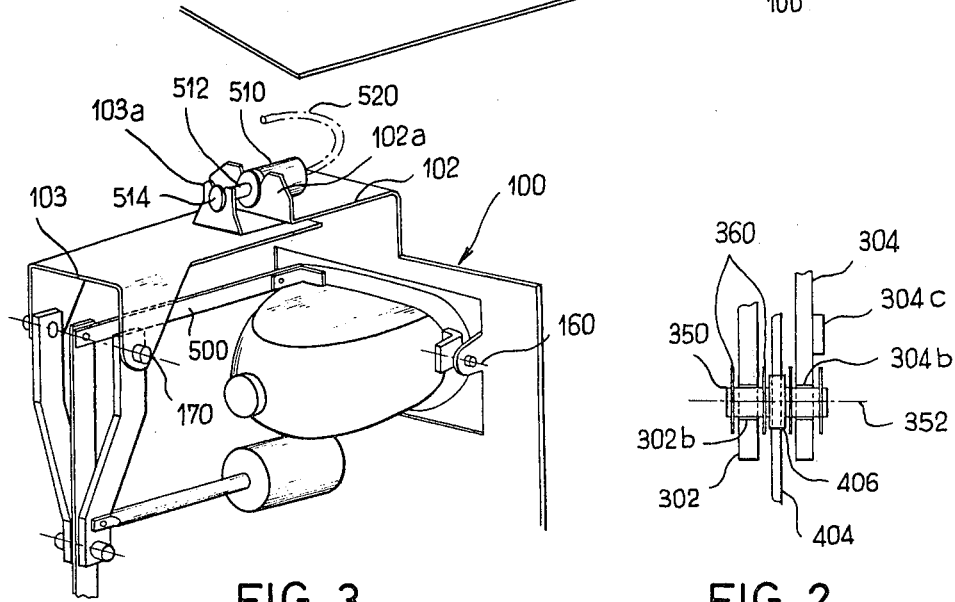
FIG_3  FIG_2

CORRECTIVE DEVICE FOR THE ORIENTATION OF A HEADLIGHT OF A MOTOR VEHICLE

BACKGROUND OF THE INVENTION

This control includes an inertial pendulum having a mass on a lower end of a pendulum shaft having an upper end pivotably connected through a first pivot to a link acting on the headlamp. Brackets on the body support a V-shaped chassis having upper ends of the arms of the V mounted on the brackets to pivot about coaxial second pivots defining a primary axis transversely of the body. Intermediate its ends the shaft is pivotably mounted by a third pivot on lower ends of the arms of the V. This third pivot provides a secondary axis transversely of the body. The chassis acts on a first shock absorber whilst the pendulum shaft acts on a weaker second shock absorber. With the vehicle standing on the level, the first pivot is coaxial with the primary axis. During acceleration or deceleration the first shock absorber holds the chassis stationary whilst the pendulum swings about the secondary axis, against the action of the second shock absorber, and moves the link which pivots the headlamp relative to the body. Such lamp movement is undesirable when the vehicle is merely travelling up or down hill in which circumstance the pendulum and chassis overcome the shock absorbers and swing together, into a vertical position, about the primary axis thus transmitting no motion to the link.

This invention relates to a corrective device for the orientation of a headlight of motor vechicle wherein the headlight is mounted to rotate about a fixed horizontal axis on a suspended body of the vehicle.

It particularly concerns a dynamic corrective device mounted on a motor vehicle in order to modify the orientation of a headlight by compensating for the effect of dynamic changes in position of the suspended part or body of the vehicle in relation to a non-suspended part for example the road wheels. In most modern vehicles, when the vehicle is in motion, the suspended body is subject to movements relative to the non-suspended part. In particular, when the vehicle is accelerating the front section of the vehicle rises, whilst when braking or decelerating it is lowered in relation to the wheels.

In such circumstances the headlights mounted on the suspended body become inefficient, in that they may shine too high (due to raising of a front section of the body) or they are directed too low (due to lowering of the same front section).

To correct such inconveniences it has already been proposed to mount the headlights in such a way that they swing around an axis which is horizontal and transverse to the body, and to make their position vary around the axis in accordance with the line of pitch of the suspended body of the vehicle. The known corrective device comprises an inertial mass which is suspended in relation to the body, and movements of the mass relative to the body are transmitted to the headlight. The inertial mass acts like an inertial pendulum which moves away from the vertical during acceleration and deceleration of the vehicle and transmits to the headlight a compensatory change in orientation. Examples of this are described in United Kingdom Pat. No. 1 489 924 and U.S. Pat. No. 1,785,332.

Devices of this kind give satisfaction in that they provide compensation for the effects of acceleration and deceleration on the orientation of the headlight's beam.

However, they have one major inconvenience. On rising and descending gradients the inertial pendulum acts like a gravitational pendulum and its position in relation to the body of the vehicle is thus modified. This results in a modification of the positioning of the headlights in relation to the body of the vehicle, which becomes a permanent maladjustment in the orientation of the headlights. This maladjustment is proportional to the gradient of the road on which the vehicle is travelling.

The present invention proposes to provide a corrective device capable of being constructed to overcome or at least mitigate this problem.

According to the invention there is provided a corrective device for the orientation of a headlight on a motor vehicle wherein the headlight is mounted to rotate about a fixed horizontal axis on a suspended body of the vehicle, comprising an inertial pendulum movable in relation to the body and joined to a point on the headlight, said point not being situated on said axis of rotation, a chassis suspended to pivot relatively to the body about a primary axis extending transversely of the body, first shock absorbing means fitted to the chassis for limiting swinging of the chassis in relation to the body, the inertial pendulum being suspended from the chassis and being pivotable about a secondary axis extending transversely of the body, second shock absorbing means fitted to the pendulum for limiting the movement of the pendulum in relation to the body, and said pendulum being joined to the headlight by the intermediary of a mechanical control link joined to the pendulum at the level of said primary axis.

When the vehicle travels along a sloping surface, the device comprising the chassis and the inertial pendulum comes to occupy a stable position in the vertical plane passing through the primary axis, and a pivot connection between the pendulum and the control link remains coincident with the primary axis, so that the control of the headlight is not influenced by the gradient. However, the orientation of the headlight is varied during acceleration and deceleration of the vehicle.

In a preferred embodiment the chassis has the form of a stirrup part with two branches apertured at their ends so that the holes at corresponding ends of the branches face each other, the holes at one set of corresponding ends allow a mounting of the chassis so that it is rotatable on two pivots forming the primary axis, whilst a shaft fits into the holes which coincide at the other ends of the branches and forms the secondary axis.

Preferably the pendulum comprises an inertial mass mounted on a second shaft having a bearing receiving the first mentioned shaft, the second shaft has an aperture receiving a pivot of a third shaft, the mechanical control link comprises said third shaft, and the distance between the bearing and said aperture corresponds to that between the secondary axis and the primary axis.

So that the corrective device is sufficiently sensitive, the first shock absorbing means attached to the chassis has greater damping characteristics than those of the second shock absorbing means attached to the pendulum, so that the pendulum can move in relation to the chassis during acceleration and/or deceleration of the vehicle.

Preferably a means of spacing should be provided on the control link in order to allow an initial adjustment by the driver of the headlight in relation to the body by varying the distance between the points where the mechanical link joins the headlight and the pendulum. In another advantageous variation the means of spacing is mounted on the body and allows a controlled displacement of the primary axis, which leads in corresponding fashion to a swing of the headlight in relation to the body.

Preferably the means of spacing comprises a hydromechanical transducer.

The invention will now be further described, by way of example, with reference to the accompanying drawing in which:

FIG. 1 is a diagrammatic representation of a corrective device on a motor vehicle formed according to the invention;

FIG. 2 shows a detail of FIG. 1 in section along the line of the arrow 800, and

FIG. 3 is a diagrammatic representation of a fragment of another embodiment of a corrective device on a motor vehicle formed according to the invention.

With reference first to FIG. 1, a suspended body of a vehicle is represented at 100. This body bears an upper plate 102 extending into a stirrup piece 103 which comprises two vertical brackets 104 and 106. These two brackets hold swivel pins 110 and 112 respectively. These swivel pins are co-axial and form a primary axis 170. When the vehicle is stationary on a horizontal plane, the axis 170 is itself horizontal and perpendicular to the longitudinal, median plane of the vehicle.

The body 100 has an opening 150 with vertical edges bearing two brackets perpendicular to the said opening (only one of these brackets being shown at 152). The bracket 152 supports a swivel pin 154. This (together with its twin which is not represented) forms an axis of rotation 160 on which a headlight 200 is mounted. Headlight 200 has an edge 202 provided with two brackets (only one shown at 206). These brackets connect with the twin swivel pins (see bracket 206 and swivel pin 154) so that the headlight is mounted in such a way as to be rotatable about the axis 160 in relation to the body 100. In addition, a bracket 204 is joined to an upper part of the edge 202 and allows the connection of a control link 500 to the headlight. The bracket 204 is not located on the axis 160.

A chassis 300 of stirrup form is made up of two branches 302 and 304 mounted to face one another, each having an aperture drilled at the upper end. Only aperture or hole 302a is visible and this receives a swivel pin 110. The lower ends of the two branches (see FIG. 2) are pierced by respective apertures or holes 302b and 304b in which is mounted a secondary shaft 350 maintained in position by washers 360 which may be held in place by clipping. The shaft 350 forms a secondary axis 352. Close to axis 352 is a pivot 304c on branch 304. Pivot 304c allows the connection of the chassis 300 to a shock absorber 600. This shock absorber comprises a casing into which a piston rod 604 joined at one end to the pivot 304c can slide.

A pendulum 400 comprises a cylindrical inertial mass 402 mounted on a flat rectilinear shaft 404. The shaft 404 carries a pivot 405 located close to the mass 402. Connected to pivot 405 is a piston rod 704 in turn connected to a shock absorber 700 which comprises a casing 702. In FIG. 2 it will be seen that the shaft 404 has a bearing 406 in which the rod 350 is mounted. The upper part of the shaft 404 has an aperture or hole 410 which allows a pivoting connection of the shaft to the link 500. The distance between the bearing 406 and the hole 410 is equal to that which separates the primary axis 170 from the secondary axis 352. Consequently, in the normal position of the chassis 300 and the pendulum 400, the vehicle travelling at a constant speed on a horizontal plane, the hole 410 is coincident with primary axis 170 and the secondary axis 352 is in the vertical plane passing through the axis 170.

The operating link 500 comprises two flat shafts 501 and 503 separated by spacing means comprising a casing 510 which is fed by a pipe 520. The shaft 501 has a pivot 502 mounted in the hole 410, while the rod 503 joined to the casing has a pivot 504 mounted in a corresponding hole on the bracket 204. The pivot 504 does not coincide with the axis 160. The casing 510 preferably comprises a hydro-mechanical transducer controlled by the intermediary of the pipe 520 from the interior of the vehicle. Thus, by sliding the rod 501 relatively to the casing 510 one can modify the length of the operating link 500, which allows an initial adjustment of the headlight by rotating it about the axis 160, the pivot connection 502 between the operating link 500 and the pendulum 400 remaining coincident with the primary axis 170 under the torque effect exercised by the mass 402 in relation to the secondary axis 352.

During acceleration and deceleration of the vehicle, the pendulum 400 is subject to swinging movements about the secondary axis 352, whilst the chassis 300 remains in a vertical plane because of the shock absorber 600. Thus the free end of the shaft 501 moves in relation to the primary axis 170 and causes a corresponding rotation of the headlight 200 about the axis 160, which allows a precise orientation of the headlight in relation to the road during changes in the life of the vehicle body 100.

When the vehicle is travelling along a gradient the chassis 300 swings gradually about the primary axis 170 in order to stay in a vertical plane passing through this axis under the effect of its own weight. The shock absorber 600 allows this movement but limits any inadvertent oscillations. The pendulum 400 acted upon equally by gravity, rotates also around the pivot 502 in order to stay in a vertical plane. Thus the whole device, chassis 300 and pendulum 400, swings about the primary axis 170. Consequently, the operating link 500 does not move and the headlight remains correctly adjusted in relation to the body 100. Of course during the transition from a horizontal part of the route to a sloping part the swinging of the whole chassis and pendulum does not exclude theoretically a movement of the pendulum in relation to the chassis. It is therefore necessary that the parameters of the shock absorbers 600 and 700 be correctly chosen so that these momentary disturbances, which could lead to a change in adjustment of the headlight 200 in relation to the body 100, be eliminated as much as possible. It should be noted that, when a stable state is achieved after the swinging of the chassis 300 and the pendulum 400 about the primary axis 170, the pendulum mass 402 can play its part in correcting orientation by rotating about the secondary axis 352 as has been described above.

FIG. 3 shows an advantageous alternative embodiment in which initial adjustment of the headlight is accomplished some what differently. In FIG. 3 reference numerals corresponding to elements which are similar to those in the upper part of FIG. 1 have, for greater clarity, not been repeated. The body 100 has an upper plate 102 ending in a perpendicular bracket 102a which is cut away to receive a flat head 514 of a piston rod 512 which is controlled by the transducer in the casing 510. The stirrup piece 103 is slidable relative to the plate 102. By acting on the transducer in casing 510 it is possible to vary the distance between the primary axis 170 and the axis of rotation 160 of the headlight. In this case the operating link 500 is composed of a single flat shaft. The relative sliding of the stirrup piece 103 and the plate 102 causes a corresponding rotation of the headlight about the axis 160 and thereby a controlled adjustment of the headlight.

What is claimed is:

1. A corrective device for the orientation of a headlight on a motor vehicle wherein the headlight is mounted to rotate about a fixed horizontal axis on a suspended body of the vehicle, comprising an inertial pendulum movable in relation to the body and joined to a point on the headlight said point not being situated on said axis of rotation, a chassis suspended to pivot relatively to the body about a primary axis extending transversely of the body, first shock absorbing means fitted to the chassis for limiting swinging of the chassis in relation to the body, the inertial pendulum being suspended from the chassis and being pivotable about a secondary axis extending transversely of the body, second shock absorbing means fitted to the pendulum for limiting the movement of the pendulum in relation to the body, and said pendulum being joined to the headlight by the intermediary of a mechanical control link joined to the pendulum at the level of said primary axis.

2. A corrective device on a motor vehicle as claimed in claim 1, in which the chassis has the form of a stirrup part with two branches apertured at their ends so that the holes at corresponding ends of the branches face each other, the holes at one set of corresponding ends allow a mounting of the chassis so that it is rotatable on two pivots forming the primary axis, whilst a shaft fits into the holes which coincide at the other ends of the branches and forms the secondary axis.

3. A corrective device on a motor vehicle as claimed in claim 2, in which the pendulum comprises an inertial mass mounted on a second shaft having a bearing receiving the first mentioned shaft, the second shaft has an aperture receiving a pivot of a third shaft, the mechanical control link comprises said third shaft, and the distance between the bearing and said aperture corresponds to that between the secondary axis and the primary axis.

4. A corrective device on a motor vehicle as claimed in claim 3, wherein the first shock absorbing means comprises a fourth shaft joined to one of the branches of the chassis at substantially the level of the first shaft, the first shock absorbing means having strong damping effect.

5. A corrective device on a motor vehicle as claimed in claim 4, in which the second shock absorbing means comprise a fifth shaft joined to the second shaft close to the inertial mass, the second shock absorbing means having a weaker damping effect than that of the first shock absorbing means.

6. A corrective device on a motor vehicle as claimed in claim 5, in which the control link comprises the third shaft aligned with a sixth shaft joined to the third shaft by adjustable spacing means which allows adjustment of the headlight in relation to the body.

7. A corrective device on a motor vehicle as claimed in claim 6, in which the spacing means comprises a hydromechanical transducer controlled from inside the vehicle.

8. A corrective device on a motor vehicle as claimed in claim 5, in which the body is provided means for spacing the primary axis in relation to the axis of rotation of the headlight to provide an initial adjustment of the headlight.

9. A corrective device on a motor vehicle as claimed in claim 8, in which the primary axis is formed by two pivots carried by a stirrup part capable of sliding in relation to the body, said sliding being occasioned by a control of a transducer type.

* * * * *